United States Patent
Liu et al.

(10) Patent No.: US 8,557,344 B2
(45) Date of Patent: Oct. 15, 2013

(54) METHOD FOR MAKING TRANSPARENT CARBON NANOTUBE COMPOSITE FILMS

(75) Inventors: Kai Liu, Beijing (CN); Ying-Hui Sun, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 88 days.

(21) Appl. No.: 13/298,184

(22) Filed: Nov. 16, 2011

(65) Prior Publication Data

US 2012/0301620 A1    Nov. 29, 2012

(30) Foreign Application Priority Data

May 27, 2011    (CN) .......................... 2011 1 0140131

(51) Int. Cl.
   *B05D 3/12*    (2006.01)

(52) U.S. Cl.
   USPC ..................... 427/384; 427/385.5; 427/430.1; 977/778; 977/809; 977/834

(58) Field of Classification Search
   None
   See application file for complete search history.

(56) References Cited

U.S. PATENT DOCUMENTS

| 2007/0243124 A1 * | 10/2007 | Baughman et al. ........ 423/447.1 |
| 2008/0248235 A1 | 10/2008 | Feng et al. |
| 2009/0092813 A1 * | 4/2009 | Lin et al. ........................ 428/220 |
| 2009/0159198 A1 * | 6/2009 | Wang et al. ................... 156/281 |

FOREIGN PATENT DOCUMENTS

KR    10-2010-0049304    5/2010

* cited by examiner

*Primary Examiner* — Erma Cameron
(74) *Attorney, Agent, or Firm* — Altis & Wispro Law Group, Inc.

(57) ABSTRACT

The present disclosure relates to a method for making a transparent carbon nanotube composite film. The method includes: (a) providing a transparent carbon nanotube film structure; (b) fixing the transparent carbon nanotube film structure on a supporting; (c) immersing the transparent carbon nanotube film structure with the supporting into a transparent polymer solution; and (d) removing the transparent carbon nanotube film structure with the supporting from the transparent polymer solution, thereby forming the transparent carbon nanotube composite film. A light transmittance of the transparent carbon nanotube composite film structure is higher than a light transmittance of the transparent carbon nanotube film structure.

20 Claims, 9 Drawing Sheets

METHOD FOR MAKING TRANSPARENT CARBON NANOTUBE COMPOSITE FILMS

CROSS-REFERENCE TO RELATED APPLICATIONS

This application claims all benefits accruing under 35 U.S.C. §119 from China Patent Application No. 201110140131.6, filed on May 27, 2011 in the China Intellectual Property Office, the disclosure of which is incorporated herein by reference.

BACKGROUND

1. Technical Field

The present disclosure relates to a method for making a transparent carbon nanotube composite film.

2. Description of Related Art

Carbon nanotubes are tubules of carbon generally having diameters ranging from 0.5 nanometers to 100 nanometers. Carbon nanotubes have recently attracted a great deal of attention for use in different applications such as field emitters, gas storage and separation, chemical sensors, and high strength composites, because of their thermal, electrical, and mechanical properties.

However, because carbon nanotubes are microscopic structures, it is necessary to assemble the carbon nanotubes into macroscopic structures. A carbon nanotube film is one kind of macroscopic structure of carbon nanotubes.

Recently, as disclosed by the pre-grant publication US20080248235 to Feng et al., a free-standing carbon nanotube film has been fabricated. The carbon nanotube film can be used in many different fields. For example, the carbon nanotube film can be used as a transparent conductive film in a touch panel or a liquid display.

This kind of carbon nanotube film is very thin and can have certain transmittance in macroscopic view. However, in microscopic view, the carbon nanotubes in the carbon nanotube film are not entirely attached on the surface of the carbon nanotube film. For example, some portions of the carbon nanotubes in the carbon nanotube film will protrude from the general surface/plane of carbon nanotube film, which makes the surface of carbon nanotube film relatively rough. When the light irradiates the rough surface of carbon nanotube film, a portion of the light will scatter, decreasing the transmittance of the carbon nanotube film. Similarly, the same problem also exists on a carbon nanotube layer including a plurality of stacked carbon nanotube films.

What is needed, therefore, is to provide a method for making a transparent carbon nanotube composite film, which can overcome the above-described shortcomings.

BRIEF DESCRIPTION OF THE DRAWINGS

Many aspects of the embodiments can be better understood with reference to the following drawings. The components in the drawings are not necessarily to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
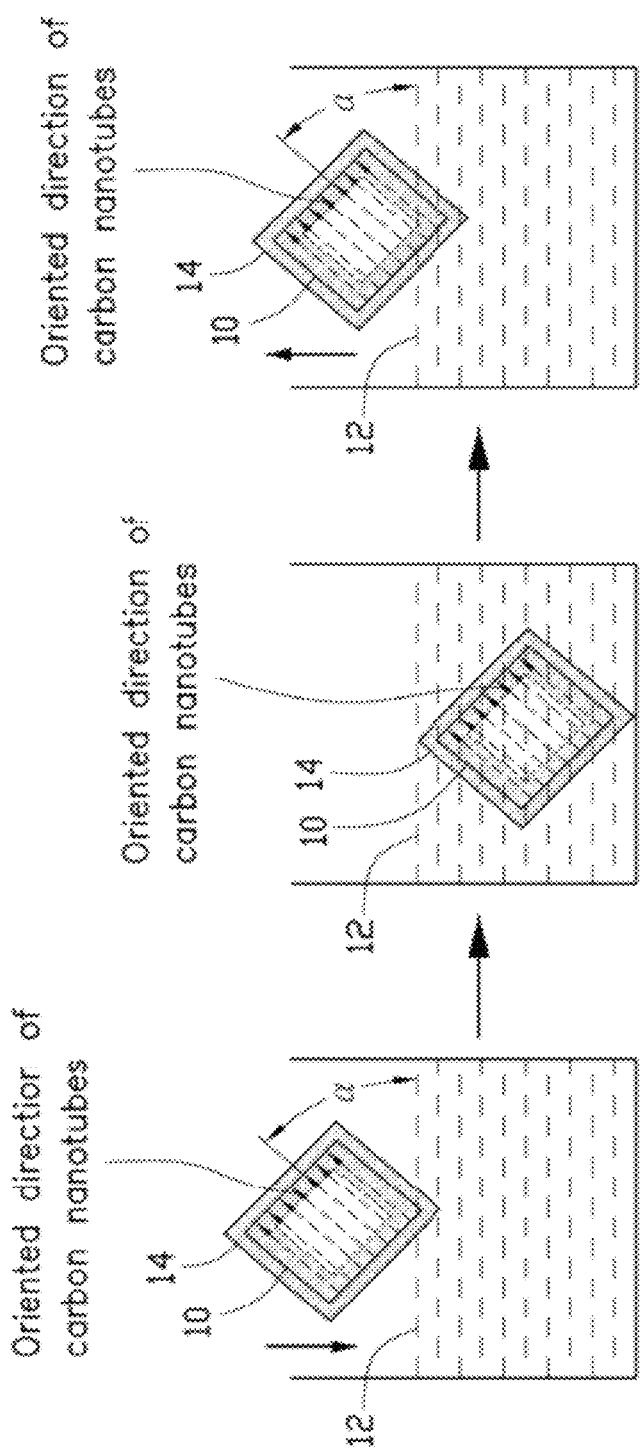
FIG. 1 shows a flow chart of one embodiment of a method of making a transparent carbon nanotube composite film.

Referring to FIG. 1, a method for making a transparent carbon nanotube composite film 16 according to one embodiment can include the following steps:

(S11) providing a transparent carbon nanotube film structure 10;

(S12) placing the transparent carbon nanotube film structure 10 on a supporting frame 14;

(S13) immersing the transparent carbon nanotube film structure 10 with the supporting frame 14 into a transparent polymer solution 12; and (S14) removing the transparent carbon nanotube film structure 10 with the supporting frame 14 from the transparent polymer solution 12 to form the transparent carbon nanotube composite film 16.

In step (S11), the transparent carbon nanotube film structure 10 is not entirely transparent, and has an amount of light transmittance. For example, the light transmittance of the transparent carbon nanotube film structure 10 is higher than 10%. The transparent carbon nanotube film structure 10 can be a free-standing structure, that is, the transparent carbon nanotube film structure 10 can support itself without a substrate. For example, if at least one point of the transparent carbon nanotube film structure 10 is held, the entire transparent carbon nanotube film structure 10 can be lifted without being damaged. The transparent carbon nanotube film structure 10 includes a plurality of carbon nanotubes. Adjacent carbon nanotubes in the transparent carbon nanotube film structure 10 combine with each other by the van der Waals force therebetween. Pores and/or interspaces are defined in the carbon nanotube film and located between adjacent carbon nanotubes. The transparent carbon nanotube film structure 10 can have a certain transmittance. The transmittance of the transparent carbon nanotube film structure 10 can be controlled by its thickness and density.

Figure 3:
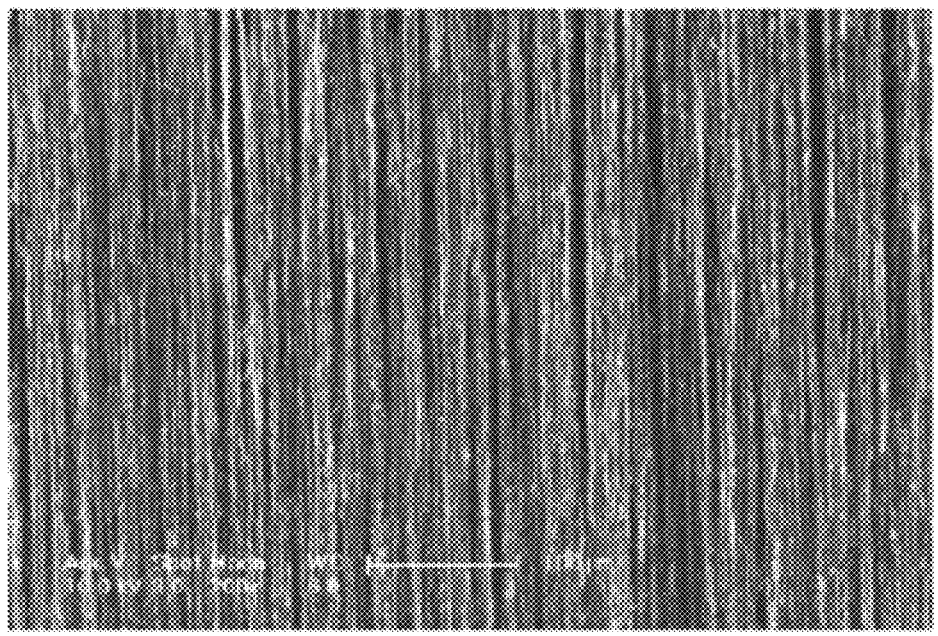
FIG. 3 is a Scanning Electron Microscope (SEM) image of a drawn carbon nanotube film.
Figure 5:
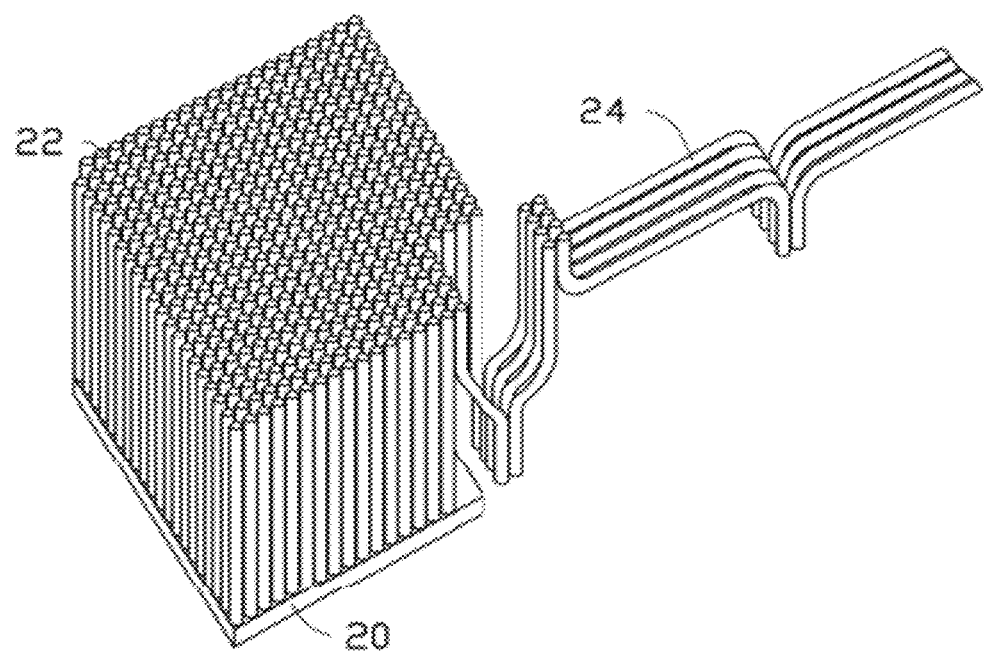
FIG. 5 shows a flow chat of drawing a drawn carbon nanotube film from a carbon nanotube array.

The transparent carbon nanotube film structure 10 can include at least one carbon nanotube film. Referring to FIGS. 3 and 5, the carbon nanotube film can be a drawn carbon nanotube film 24 formed by drawing a film from a carbon nanotube array 22. In one embodiment, the transparent carbon nanotube film structure 10 includes one drawn carbon nanotube film 24. The drawn carbon nanotube film 24 includes a plurality of carbon nanotubes. The plurality of carbon nanotubes in the drawn carbon nanotube film 24 is arranged substantially parallel to a surface of the drawn carbon nanotube film 24. A large number of the carbon nanotubes in the drawn carbon nanotube film 24 can be oriented along a preferred orientation, meaning that a large number of the carbon nanotubes in the drawn carbon nanotube film 24 are arranged substantially along a same direction. An end of one carbon nanotube is joined to another end of an adjacent carbon nanotube arranged substantially along the same direction, by van der Waals force, to form a free-standing film. The term 'free-standing' includes films that do not have to be supported by a substrate. A small number of the carbon nanotubes are randomly arranged in the drawn carbon nanotube film 24, and have a small if not negligible effect on the larger number of the carbon nanotubes in the drawn carbon nanotube film 24, that are arranged substantially along the same direction. It can be appreciated that some variation can occur in the orientation of the carbon nanotubes in the drawn carbon nanotube film 24. Microscopically, the carbon nanotubes oriented substantially along the same direction may not be perfectly aligned in a straight line, and some curved portions may exist. It can be understood that contact between some carbon nanotubes located substantially side by side and oriented along the same direction cannot be totally excluded.

The drawn carbon nanotube film 24 includes a plurality of successively oriented carbon nanotube segments joined end-to-end by van der Waals force therebetween. Each carbon nanotube segment includes a plurality of carbon nanotubes substantially parallel to each other, and joined by van der Waals force therebetween. The carbon nanotube segments can vary in width, thickness, uniformity, and shape. The carbon nanotubes in the drawn carbon nanotube film 24 are also substantially oriented along a preferred orientation. The width of the drawn carbon nanotube film 24 relates to the carbon nanotube array from which the drawn carbon nanotube film 24 is drawn. Furthermore, the carbon nanotube film has an extremely large specific surface area, and is very sticky.

In macroscopic view, the plurality of carbon nanotubes in the drawn carbon nanotube film 24 is basically located at a surface of the drawn carbon nanotube film 24. Furthermore, the drawn carbon nanotube film 24 is very thin, about 0.5 nanometers to about 100 micrometers in thickness. Therefore, the drawn carbon nanotube film 24 can have a certain transmittance. However, in microscopic view, not all the carbon nanotubes in the drawn carbon nanotube film 24 are entirely in the same plane. For example, some of the carbon nanotubes in the drawn carbon nanotube film 24 can protrude from the general surface/plane of drawn carbon nanotube film 24, or, interspaces can be defined in the carbon nanotube film by adjacent carbon nanotubes, which can make the surface of the drawn carbon nanotube film 24 really rough. When the light irradiates the rough surface of the drawn carbon nanotube film 24, a portion of the light can be scattered, whereby the transmittance of the drawn carbon nanotube film 24 will be decreased. In one embodiment, the transmittance of the drawn carbon nanotube film 24 is about 77%.

The transparent carbon nanotube film structure 10 can include more than one stacked drawn carbon nanotube film 24. An angle can exist between the oriented directions of the carbon nanotubes in adjacent films. Adjacent drawn carbon nanotube films 24 can be combined by the van der Waals force therebetween without the need of an adhesive.

An angle between the oriented directions of the carbon nanotubes in two adjacent drawn carbon nanotube films 24 can range from about 0 degrees to about 90 degrees. Pores and/or interspaces are defined between two adjacent carbon nanotubes in the drawn carbon nanotube film 24. The number of layers of the drawn carbon nanotube films 24 in the carbon nanotube film structure 10 is not limited. In one embodiment, the carbon nanotube film structure 10 includes two layers to five layers of stacked drawn carbon nanotube films 24. Similarly, a problem of low transmittance also exists with the carbon nanotube film structure 10 that includes a plurality of stacked drawn carbon nanotube film 24.

Figure 4:
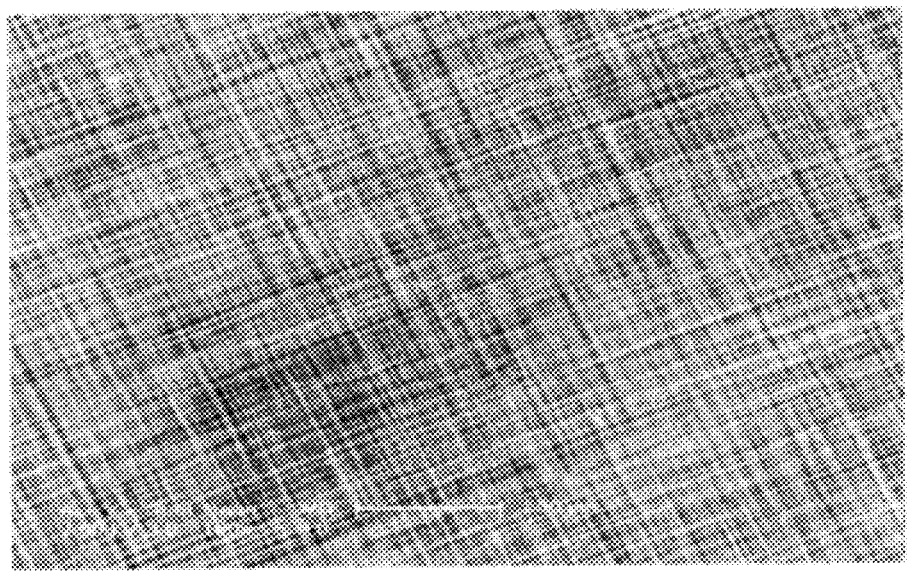
FIG. 4 is an SEM image of a transparent carbon nanotube film structure including a plurality of stacked drawn carbon nanotube films.
Figure 8:
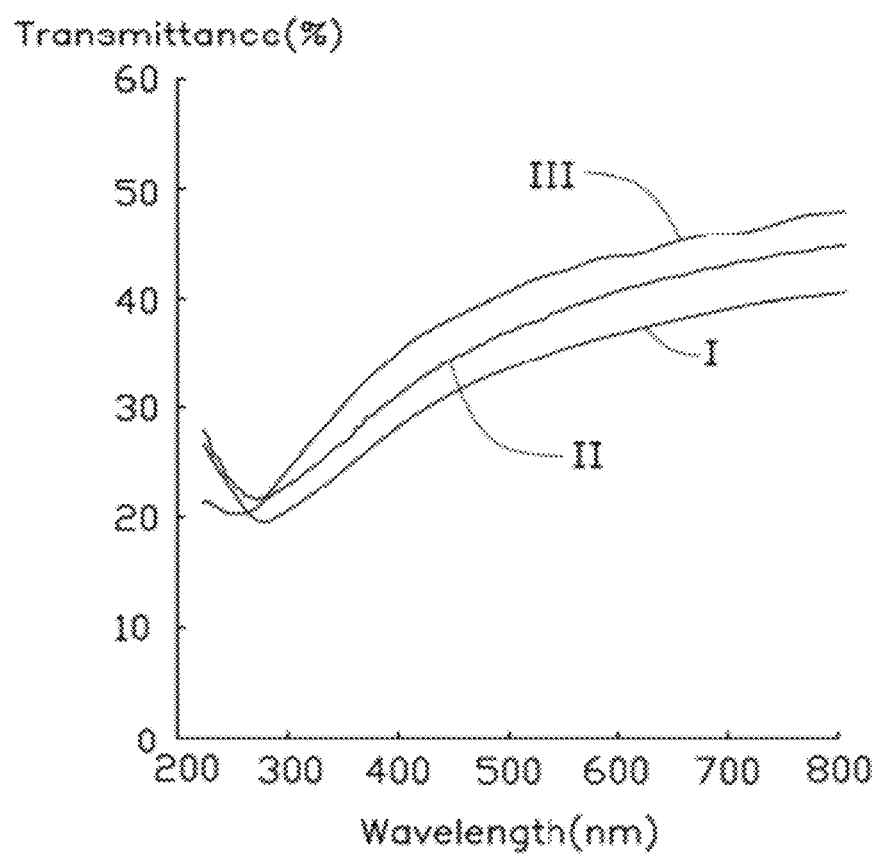
FIG. 8 shows transmittance curves of an embodiment of four stacked drawn carbon nanotube films treated with polyvinyl alcohol and polyvinyl alcohol/dimethyl sulfoxide solution respectively.

Referring to FIGS. 4 and 8, in other embodiments, the carbon nanotube film structure 10 includes four layers of stacked drawn carbon nanotube films 24. An angle between the aligned directions of the carbon nanotubes in two adjacent drawn carbon nanotube films 24 is about 90 degrees. The transmittance of four layers of stacked drawn carbon nanotube films 24 is less than 40%.

Figure 6:
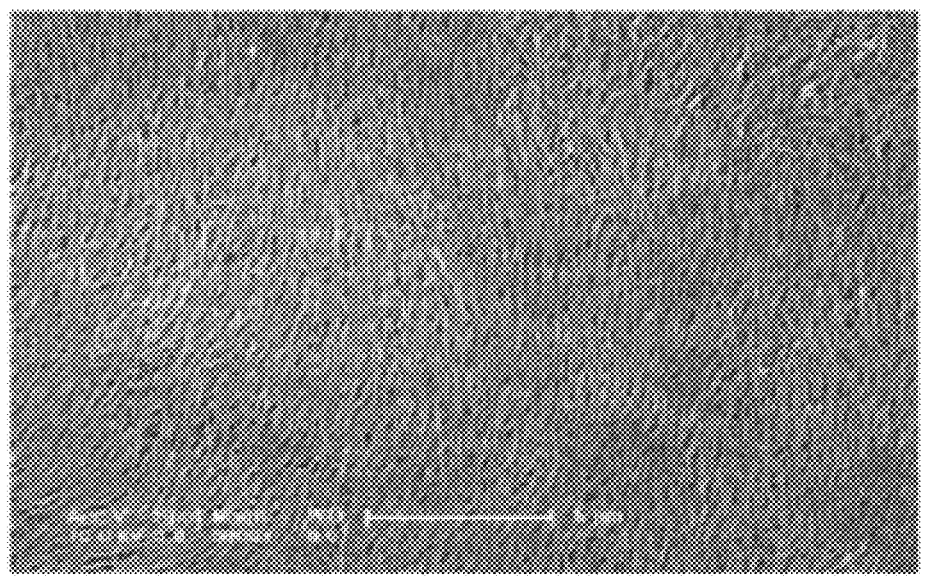
FIG. 6 is an SEM image of a pressed carbon nanotube film.

Referring to FIG. 6, the carbon nanotube film can also be a pressed carbon nanotube film formed by pressing a carbon nanotube array down on the substrate. The carbon nanotubes in the pressed carbon nanotube array can be arranged along a same direction or along different directions. The carbon nanotubes in the pressed carbon nanotube array can rest upon each other. Some of the carbon nanotubes in the pressed carbon nanotube film can protrude from a general surface/plane of the pressed carbon nanotube film. Pores and/or interspaces are defined between two adjacent carbon nanotubes in the pressed carbon nanotube film. Adjacent carbon nanotubes are attracted to each other and combined by van der Waals force. An angle between a primary alignment direction of the carbon nanotubes and a surface of the pressed carbon nanotube array is about 0 degrees to approximately 15 degrees. The greater the pressure applied, the smaller the angle obtained. When the carbon nanotubes in the pressed carbon nanotube array are arranged along different directions, the carbon nanotube structure can be isotropic. The thickness of the pressed carbon nanotube array can range from about 0.5 nm to about 1 millimeter. The length of the carbon nanotubes can be larger than 50 micrometers. Examples of the pressed carbon nanotube film are taught by US PGPub. 20080299031 A1 to Liu et al.

Referring to FIG. 6, the carbon nanotube film can also be a flocculated carbon nanotube film formed by a flocculating method. The flocculated carbon nanotube film can include a plurality of long, curved, disordered carbon nanotubes entangled with each other. A length of the carbon nanotubes can be greater than 10 centimeters. In one embodiment, the length of the carbon nanotubes is in a range from about 200 microns to about 900 micrometers. The carbon nanotubes can be substantially uniformly distributed in the carbon nanotube film. The adjacent carbon nanotubes are acted upon by the van der Waals force therebetween. Some of the carbon nanotubes in the flocculated carbon nanotube film can protrude from a general surface/plane of flocculated carbon nanotube film. Pores and/or interspaces are defined between two adjacent carbon nanotubes in the flocculated carbon nanotube film. The thickness of the flocculated carbon nanotube film can range from about 1 micrometer to about 1 millimeter.

Referring to FIG. 5, in one embodiment, the transparent carbon nanotube film structure 10 is a drawn carbon nanotube film 24. A method for making the drawn carbon nanotube film 24 can include the sub-steps of: (S111) providing a carbon nanotube array 22 capable of having a film drawn therefrom; and (S112) pulling/drawing out a drawn carbon nanotube film 24 from the carbon nanotube array 22. The pulling/drawing can be done by using a tool (e.g., adhesive tape, pliers, tweezers, or another tool allowing multiple carbon nanotubes to be gripped and pulled simultaneously).

In step (S111), the given carbon nanotube array 22 can be formed by a chemical vapor deposition (CVD) method. The carbon nanotube array 22 includes a plurality of carbon nanotubes parallel to each other and approximately perpendicular to the substrate 20. The carbon nanotubes in the carbon nanotube array 22 are closely packed together by van der Waals force. The carbon nanotubes in the carbon nanotube array 22 can be single-walled carbon nanotubes, double-walled carbon nanotubes, multi-walled carbon nanotubes, or combinations thereof. The diameter of the carbon nanotubes can be in a range from about 0.5 nanometers to about 50 nanometers. The height of the carbon nanotubes can be in a range from about 50 nanometers to 5 millimeters. In one embodiment, the height of the carbon nanotubes can be in a range from about 100 microns to 900 microns.

In step (S112), the drawn carbon nanotube film 24 includes a plurality of carbon nanotubes, and there are interspaces between adjacent two carbon nanotubes. Carbon nanotubes in the drawn carbon nanotube film 24 can be substantially parallel to a surface of the drawn carbon nanotube film 24. A distance between adjacent two carbon nanotubes can be larger than a diameter of the carbon nanotubes. The drawn carbon nanotube film 24 can be pulled/drawn by the following sub-steps: (S112a) selecting a carbon nanotube segment having a predetermined width from the carbon nanotube array 22; and (S112b) pulling the carbon nanotube segment at an even/uniform speed to achieve a uniform drawn carbon nanotube film 24.

In step (S112a), the carbon nanotube segment having a predetermined width can be selected by using an adhesive tape to contact the carbon nanotube array 22. The carbon nanotube segment includes a plurality of carbon nanotubes parallel to each other. In step (S112b), the pulling direction is arbitrary (e.g., substantially perpendicular to the growing direction of the carbon nanotube array 22).

More specifically, during the pulling process, as the initial carbon nanotube segment is drawn out, other carbon nanotube segments are also drawn out end-to-end due to the van der Waals force between ends of adjacent segments. This process of drawing ensures that a continuous, uniformly drawn carbon nanotube film 24 having a predetermined width can be formed. The drawn carbon nanotube film 24 has an extremely large specific surface area, and so is very sticky.

In step (S12), a supporting frame 14 is provided. The supporting frame 14 can be used to support the transparent carbon nanotube film structure 10. The supporting frame 14 has a through hole. At least part of the carbon nanotube film structure is suspended over the trough hole. After the supporting frame 14 is provided, the transparent carbon nanotube film structure 10 is placed on the supporting frame 14. In one embodiment, the transparent carbon nanotube film structure 10 covers the through hole, and is suspended over the through hole. Because the transparent carbon nanotube film structure 10 is adhesive in nature, the transparent carbon nanotube film structure 10 can be firmly fixed on the supporting frame 14. In one embodiment, periphery of the transparent carbon nanotube film structure 10 is firmly fixed on the supporting frame 14 by the van der Waals force therebetween.

In another embodiment, after the step (S12), a step (S121) of applying another supporting frame 14 on the periphery of the transparent carbon nanotube film structure 10 can be further provided. In the step (S121), the transparent carbon nanotube film structure 10 is located between the two supporting frames 14 to form a layered structure. When the layered structure is formed, the transparent carbon nanotube film structure 10 is secured by the two supporting frames 14. The structure of the two supporting frames 14 can be the same.

In step (S13), a transparent polymer solution 12 is provided. The transparent polymer solution 12 can be located in a container and has a surface. The surface is parallel with the horizontal direction. The transparent polymer solution 12 can be formed by dissolving a polymer into a solvent. The polymer can be a transparent polymer. A weight percentage of the polymer in the transparent polymer solution 12 can be lower than 10 wt %. In one embodiment, the weight percentage of the polymer in the transparent polymer solution 12 is lower than 5 wt %. A material of the polymer can be polyvinyl alcohol (PVA), polycarbonate (PC), polyacrylate (NBS), polysulfone (PSF), polystyrene (PS), polyester, polyolefin or combination thereof. The material of the polymer is not limited, just to make sure that the polymer can have a certain transmittance. In one embodiment, the transmittance of the polymer is greater than 77%. In other embodiments, the transmittance of the polymer is greater than 80%. Material of the solvent is not limited, just to make sure that the polymer can be dissolved in the solvent. In one embodiment, the transparent polymer solution 12 is a polyvinyl alcohol/dimethyl sulfoxide (PVA/DMSO) solution. The polyvinyl alcohol/dimethyl sulfoxide (PVA/DMSO) solution is formed by dissolving the polyvinyl alcohol into the dimethyl sulfoxide. A weight percentage of the polyvinyl alcohol in the polyvinyl alcohol/dimethyl sulfoxide solution is about 1 wt %.

Figure 2:
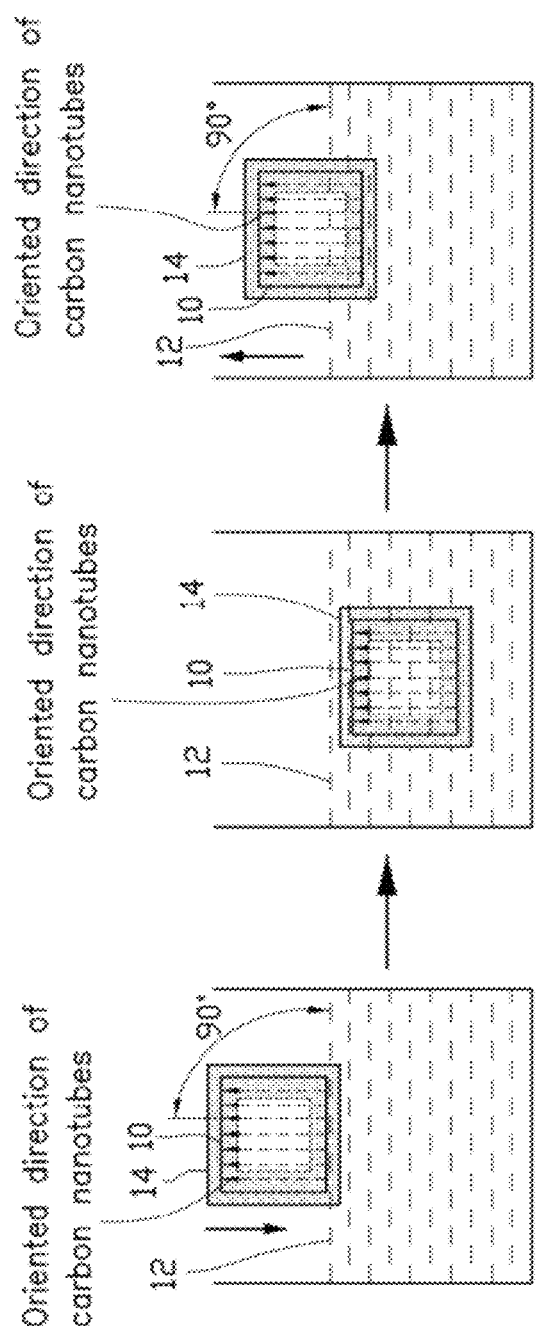
FIG. 2 shows a flow chart of another embodiment of a method of making a transparent carbon nanotube composite film.

After the transparent polymer solution 12 is provided, the transparent carbon nanotube film structure 10 with the supporting frame 14 is further immersed into the transparent polymer solution 12. When the transparent carbon nanotube film structure 10 is immersed into the transparent polymer solution 12, an angle between the transparent carbon nanotube film structure 10 and the surface of the transparent polymer solution 12 can be formed. In one embodiment, the angle between the transparent carbon nanotube film structure 10 and the surface of the transparent polymer solution 12 is about 90 degrees. Furthermore, when the carbon nanotubes in the transparent carbon nanotube film structure 10 are substantially oriented along a preferred direction, an angle α between the oriented direction of the carbon nanotubes in the transparent carbon nanotube film structure 10 and the surface of the transparent polymer solution 12 can be formed. Referring to FIG. 2, in one embodiment, the angle α between oriented direction of the carbon nanotubes in the transparent carbon nanotube film structure 10 and the surface of the transparent polymer solution 12 is about 90 degrees.

In step (S13), when the transparent carbon nanotube film structure 10 is immersed in the transparent polymer solution 12, both sides of the transparent carbon nanotube film structure 10 can be pressed under pressure of the transparent polymer solution 12. The pressure can press down on the protruding portions of the carbon nanotubes protruding from the surface of transparent carbon nanotube film structure 10, to make the carbon nanotubes of transparent carbon nanotube film structure 10 more evenly attached on the surface of transparent carbon nanotube film structure 10. When the transparent carbon nanotube film structure 10 includes at least two stacked carbon nanotube films, the pressure can press the carbon nanotube films at both sides of the transparent carbon nanotube film structure 10, to make the carbon nanotube films in the transparent carbon nanotube film structure 10 contact with each other more firmly. Furthermore, the pores and/or interspaces of the transparent carbon nanotube film structure 10 can be filled with the transparent polymer solution 12.

In step (S14), after the transparent carbon nanotube film structure 10 with the supporting frame 14 is immersed into the transparent polymer solution 12 for a period of time, the transparent carbon nanotube film structure 10 with the supporting frame 14 is removed from the transparent polymer solution 12 to obtain the transparent carbon nanotube composite film 16. The transparent carbon nanotube film structure 10 can be removed slowly from the transparent polymer solution 12. When the transparent carbon nanotube film structure 10 is removed from the transparent polymer solution 12, an angle between the transparent carbon nanotube film structure 10 and the surface of the transparent polymer solution 12 can be formed. In one embodiment, the angle between the transparent carbon nanotube film structure 10 and the surface of the transparent polymer solution 12 is about 90 degrees.

Furthermore, when the carbon nanotubes in the transparent carbon nanotube film structure 10 are substantially oriented along a preferred direction, an angle α between the oriented direction of the carbon nanotubes in the transparent carbon nanotube film structure 10 and the surface of the transparent polymer solution 12 can be formed. Referring to FIG. 2, in one embodiment, the angle α between the oriented direction of the carbon nanotubes in the transparent carbon nanotube film structure 10 and the surface of the transparent polymer solution 12 is about 90 degrees. If the angle α is less than 90 degrees, the oriented direction of the carbon nanotubes in the transparent carbon nanotube film structure 10 can be affected by the pressure of the transparent polymer solution 12, during the process of removing transparent carbon nanotube film structure 10 from the transparent polymer solution 12.

After removing the transparent carbon nanotube film structure 10 with the supporting frame 14 from the transparent polymer solution 12, an optional step (S15) of heating the transparent carbon nanotube composite film 16 with the supporting frame 14 can be performed. During the heating process, the solvent can be evaporated from the transparent carbon nanotube composite film 16, and the transparent polymer can be solidified and deposited in the pores and/or interspaces of transparent carbon nanotube film structure 10 to form the transparent carbon nanotube composite film 16.

It should be noted that, because the weight percentage of the polymer in the transparent polymer solution 12 is low, and the transparent carbon nanotube film structure 10 is vertically immersed in the transparent polymer solution 12 and then removed, the transparent polymer solution 12 can be uniformly absorbed in the pores and/or interspaces of the transparent carbon nanotube film structure 10. During heating, most of the polymer can be solidified and deposited in the pores and/or interspaces of transparent carbon nanotube film structure 10 to form the transparent carbon nanotube composite film 16, rather than covering on the surface of the transparent carbon nanotube film structure 10. Therefore, the surface of the transparent carbon nanotube film structure 10 will become smooth. It is to be understood that, the polymer may not be perfectly solidified and deposited in the pores and/or interspaces of transparent carbon nanotube film structure 10, and a small amount of polymer may remain on the surface of transparent carbon nanotube film structure 10.

Figure 7:
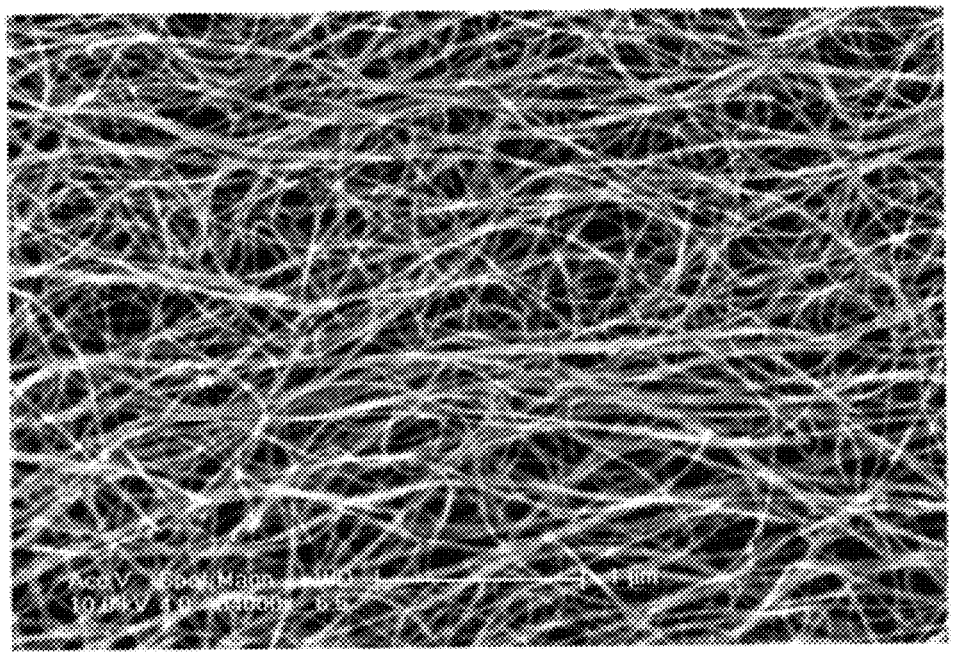
FIG. 7 is an SEM image of a flocculated carbon nanotube film.

When the light irradiates the surface of transparent carbon nanotube composite film 16, most of the light can pass through the transparent carbon nanotube composite film 16 without scattering. Thus, the transmittance of transparent carbon nanotube composite film 16 can be increased. Referring to FIG. 7, curve I is the transmittance curve of the four stacked drawn carbon nanotube films 24, an angle between the aligned directions of the carbon nanotubes in two adjacent drawn carbon nanotube films 24 is about 90 degrees. Curve II is the transmittance curve of the four stacked drawn carbon nanotube films 24 after being immersed into the dimethyl sulfoxide solvent. Curve III is the transmittance curve of the four stacked drawn carbon nanotube films 24 after being immersed into the polyvinyl alcohol/dimethyl sulfoxide solution.

Figure 9:
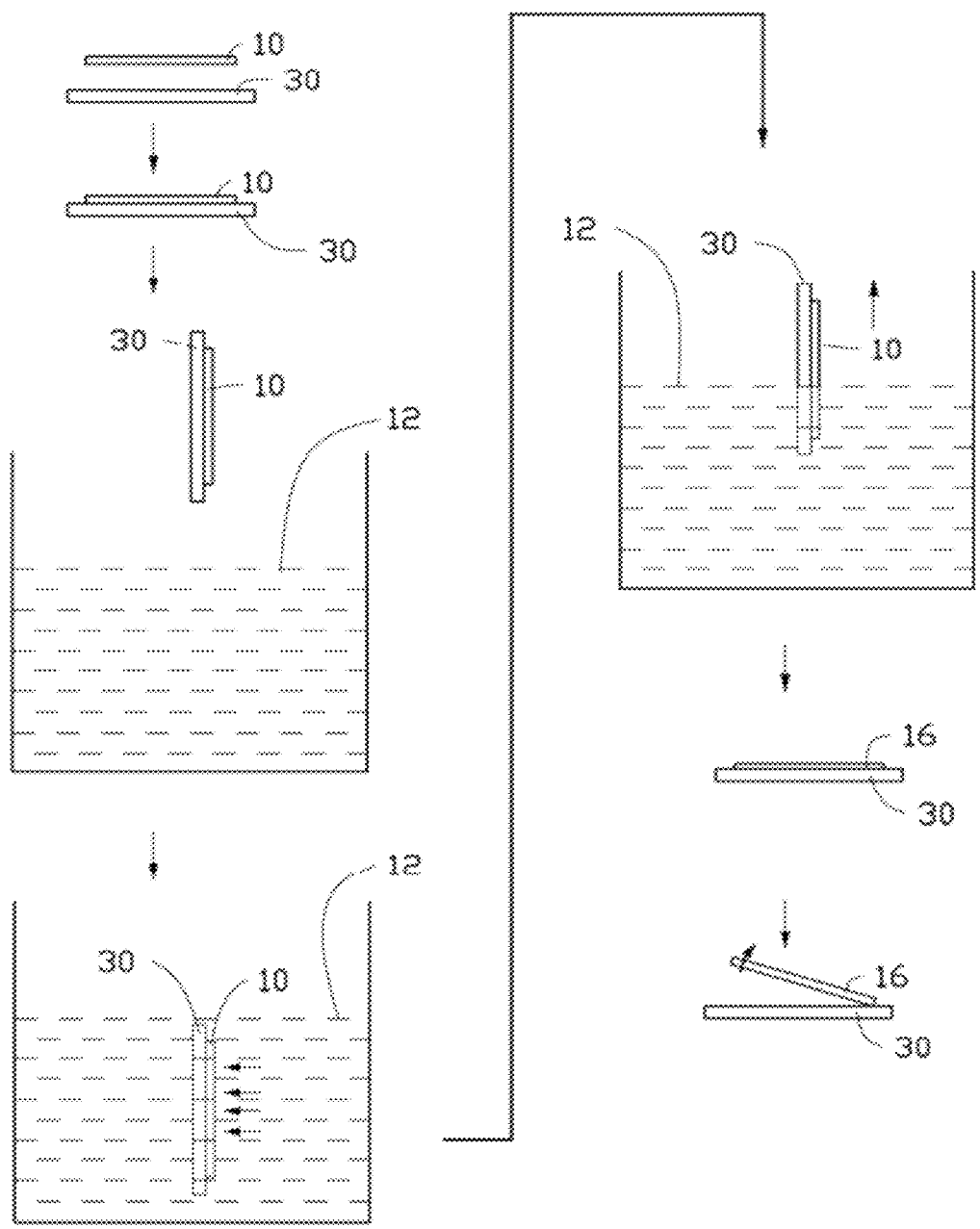
FIG. 9 shows a flow chart of another embodiment of making a transparent carbon nanotube composite film

Referring to FIG. 9, a method for making a transparent carbon nanotube composite film 16 according to another embodiment can include the following steps:

(S21) providing a transparent carbon nanotube film structure 10;

(S22) placing the transparent carbon nanotube film structure 10 on a supporting substrate 30;

(S23) immersing the transparent carbon nanotube film structure 10 with the supporting substrate 30 into the transparent polymer solution 12; and (S24) removing the transparent carbon nanotube film structure 10 with the supporting substrate 30 from the transparent polymer solution 12 to form the transparent carbon nanotube composite film 16.

In step (S21), the transparent carbon nanotube film structure 10 includes a single drawn carbon nanotube film 24. Other characteristics of step (S21) are the same as step (S11) disclosed above.

In step (S22), a supporting substrate 30 is provided. The supporting substrate 30 can be used to support the transparent carbon nanotube film structure 10. The supporting substrate 30 can have a sheet-like structure having a certain mechanical strength. A material of the supporting substrate 30 can be metal, metal oxide, inorganic salts, ceramics, or other non-transparent materials. The material of the supporting substrate 30 can also be glass, quartz, plastics, or other transparent materials. The supporting substrate 30 should be large enough to wholly support the transparent carbon nanotube film structure 10. The surface of the supporting substrate 30 can be a flat surface, a curved surface, or other irregular surfaces. In one embodiment, the supporting substrate 30 is a glass substrate.

In step (S22), the transparent carbon nanotube film structure 10 is placed on the surface of the supporting substrate 30 to form a layered structure. Because the transparent carbon nanotube film structure 10 is adhesive in nature, the transparent carbon nanotube film structure 10 can be firmly fixed on the surface of the supporting substrate 30 without the use of an adhesive.

In some embodiments, when the supporting substrate 30 is large enough to support more than one transparent carbon nanotube film structure 10, the step (S22) can be replaced with a step (S22'). Step (S22') includes the following step: arranging a plurality of transparent carbon nanotube film structures 10 spaced from each other on the surface of the supporting substrate 30. The plurality of transparent carbon nanotube film structures 10 can be located side by side.

The step (S23) is substantially the same as the step (S13), except that the transparent carbon nanotube film structure 10 on the surface of the supporting substrate 30 is immersed in the transparent polymer solution 12. When the transparent carbon nanotube film structure 10 is immersed into the transparent polymer solution 12, an angle between the transparent carbon nanotube film structure 10 and the surface of the transparent polymer solution 12 can be formed. In one embodiment, the angle between the transparent carbon nanotube film structure 10 and the surface of the transparent polymer solution 12 is about 90 degrees. Furthermore, when the carbon nanotubes in the transparent carbon nanotube film structure 10 are substantially oriented along a preferred direction, an angle α between the oriented direction of the carbon nanotubes in the transparent carbon nanotube film structure 10 and the surface of the transparent polymer solution 12 will be formed. In one embodiment, the angle α between the oriented direction of the carbon nanotubes in the transparent carbon nanotube film structure 10 and the surface of the transparent polymer solution 12 is about 90 degrees.

It shout be noted that, when the transparent carbon nanotube film structure 10 is immersed in the transparent polymer solution 12, a side of the transparent carbon nanotube film structure 10 away from the supporting substrate 30 can be pressed under the pressure from the transparent polymer solution 12. The pressure can press down on the protruding portions of the carbon nanotubes protruding from the surface of transparent carbon nanotube film structure 10, to more evenly attach the carbon nanotubes of the transparent carbon nanotube film structure 10 on the surface of the transparent carbon nanotube film structure 10. When the transparent carbon nanotube film structure 10 includes at least two stacked carbon nanotube films, the pressure can press the carbon nanotube films of the transparent carbon nanotube film structure 10, to make the carbon nanotube films in the transparent carbon nanotube film structure 10 contact with each other more firmly.

In step (S24), after the transparent carbon nanotube film structure 10 on the surface of the supporting substrate 30 is immersed in the transparent polymer solution 12 for a time, the transparent carbon nanotube film structure 10 with the supporting substrate 30 is removed from the transparent polymer solution 12 to obtain the transparent carbon nanotube composite film 16 on the surface of the supporting substrate 30.

After removing the transparent carbon nanotube film structure 10 with the supporting substrate 30 from the transparent polymer solution 12, an optional step (S25) of heating the transparent carbon nanotube composite film 16 on the surface of the supporting substrate 30 can be further provided. During the heating process, the solvent can be evaporated from the transparent carbon nanotube composite film 16, and the transparent polymer can be solidified or deposited in the pores and/or interspaces of transparent carbon nanotube film structure 10 to form the transparent carbon nanotube composite film 16 on the surface of the supporting substrate 30.

When the supporting substrate 30 is transparent, most of the light irradiated the surface of the transparent carbon nanotube composite film 16 can pass through the transparent carbon nanotube composite film 16 and the supporting substrate 30 without scattering. Thus, the transmittance of whole structure of the transparent carbon nanotube composite film 16 and the supporting substrate 30 can be increased.

After the transparent carbon nanotube composite film 16 is formed on the surface of the supporting substrate 30, the step (S24) can further include a step (S26) of peeling the transparent carbon nanotube composite film 16 from the surface of the supporting substrate 30. Because the transparent polymer is solidified and deposited in the pores and/or interspaces of transparent carbon nanotube film structure 10, the toughness and mechanical strength of the transparent carbon nanotube composite film 16 can be increased. Therefore, the transparent carbon nanotube composite film 16 can be peeled from the surface of the supporting substrate 30 easily without damage. In one embodiment, the transmittance of the transparent carbon nanotube composite film 16 can be equal to or greater than 82%. In other embodiments, the transmittance of the transparent carbon nanotube composite film 16 can be equal to or greater than 85%. In other embodiments, the transmittance of the transparent carbon nanotube composite film 16 can be equal to or greater than 90%.

The method for making a transparent carbon nanotube composite film has at least the following advantages. First, when the transparent carbon nanotube film structure is immersed in the transparent polymer solution, the pressure from the transparent polymer solution can press down on the protruding portions of the carbon nanotubes protruding from the surface of transparent carbon nanotube film structure to make the surface of the transparent carbon nanotube film structure more smooth. Furthermore, when the transparent carbon nanotube film structure includes at least two stacked carbon nanotube films, the pressure can press the carbon nanotube films of the transparent carbon nanotube film structure, to make the carbon nanotube films in the transparent carbon nanotube film structure contact with each other more firmly. Thus, the transmittance of transparent carbon nanotube composite film can be increased.

Second, the pores and/or interspaces of the transparent carbon nanotube film structure can be the filled with the transparent polymer solution, to obtain a smooth surface. When the light irradiates the surface of transparent carbon nanotube composite film, most of the light can pass through the transparent carbon nanotube composite film without scattering. Thus, the transmittance of transparent carbon nanotube composite film can be increased.

Third, because the transparent polymer is solidified and deposited in the pores and/or interspaces of transparent carbon nanotube film structure, the toughness and mechanical strength of the transparent carbon nanotube composite film can be improved.

Finally, the method of making a transparent carbon nanotube composite film is a simple process accomplished at relatively low cost.

The above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a transparent carbon nanotube composite film comprising the following steps:
   (a) providing a transparent carbon nanotube film structure comprising a part of carbon nanotubes protruding from a surface of the transparent carbon nanotube film structure;
   (b) placing the transparent carbon nanotube film structure on a supporting body;
   (c) immersing the transparent carbon nanotube film structure with the supporting body into a transparent polymer solution having a surface, and pressing down the part of carbon nanotubes protruding from the surface of the transparent carbon nanotube film structure by a pressure from the transparent polymer solution to make the part of carbon nanotubes substantially in a same planar surface, wherein the supporting body is substantially vertical to the surface of the transparent polymer solution; and
   (d) removing the transparent carbon nanotube film structure with the supporting body thereon from the transparent polymer solution, to form the transparent carbon nanotube composite film structure, a light transmittance of the transparent carbon nanotube composite film structure is higher than a light transmittance of the transparent carbon nanotube film structure.

2. The method of claim 1, wherein the transparent carbon nanotube film structure comprises at least one carbon nanotube film drawn from a carbon nanotube array.

3. The method of claim 2, wherein each carbon nanotube film comprises a plurality of carbon nanotubes, the plurality of carbon nanotubes in the carbon nanotube film are joined end-to-end by van der Waals force therebetween to from a free standing structure.

4. The method of claim 2, wherein a plurality of spaces are defined by adjacent carbon nanotubes in the at least one carbon nanotube film.

5. The method of claim 1, wherein the polymer comprises a material that is selected from the group consisting of polyvinyl alcohol, polycarbonate, polyacrylate, polysulfone, polystyrene, polyester, polyolefin and combinations thereof.

6. The method of claim 5, wherein a weight percentage of the polymer in the transparent polymer solution is lower than or equal to 10% wt.

7. The method of claim 1, wherein the supporting body is a supporting frame, and the step (b) comprises
placing a periphery of the transparent carbon nanotube film structure on the supporting frame.

8. The method of claim 7, wherein after the periphery of the transparent carbon nanotube film structure is placed on the supporting frame, the step (b) further comprises a step of:
applying a second supporting frame on the periphery of the transparent carbon nanotube film structure.

9. The method of claim 1, wherein the supporting body is a supporting substrate comprising a surface, and the step (b) comprises
placing the transparent carbon nanotube film structure on the surface of the supporting substrate.

10. The method of claim 9, wherein the supporting substrate comprises a material of that is selected from the group consisting of metals, metal oxides, inorganic salts, ceramics, glass, quartz, plastics, and combinations thereof.

11. The method of claim 1, wherein the transparent carbon nanotube film structure comprises a plurality of carbon nanotubes oriented along a preferred orientation, and the step of immersing the transparent carbon nanotube film structure with the supporting body into a transparent polymer solution further comprises a step of immersing the plurality of carbon nanotubes of the transparent carbon nanotube film structure vertically into the transparent polymer solution.

12. The method of claim 1, wherein the step of removing the transparent carbon nanotube film structure with the supporting body from the transparent polymer solution further comprises removing the transparent carbon nanotube film structure with the supporting body vertically from the transparent polymer solution.

13. The method of claim 12, wherein the transparent carbon nanotube film structure comprises a plurality of carbon nanotubes oriented along a preferred orientation, and the step of removing the transparent carbon nanotube film structure with the supporting body from the transparent polymer solution further comprises removing the plurality of carbon nanotubes of the transparent carbon nanotube film structure vertically from the transparent polymer solution.

14. The method of claim 1, further comprising a step of heating the transparent carbon nanotube film structure with the supporting body after the transparent carbon nanotube film structure with the supporting body is removed from the transparent polymer solution.

15. A method for making more than one transparent carbon nanotube composite films comprising the following steps:
(a) providing a plurality of transparent carbon nanotube film structures comprising a part of carbon nanotubes protruding from a surface of the plurality of transparent carbon nanotube film structures;
(b) providing a supporting substrate, the supporting substrate comprising a surface;
(c) placing the plurality of transparent carbon nanotube film structures on the surface of the supporting substrate;
(d) immersing the plurality of transparent carbon nanotube film structures with the supporting substrate into a transparent polymer solution having a surface, and pressing down the part of carbon nanotubes protruding from the surface of the plurality of transparent carbon nanotube film structures under pressure of the transparent polymer solution to make the surface of the plurality of transparent carbon nanotube film structures contact with each other firmly, wherein the supporting body is substantially vertical to the surface of the transparent polymer solution; and
(e) removing the plurality of transparent carbon nanotube film structures with the supporting substrate from the transparent polymer solution, to form a plurality of transparent carbon nanotube composite film structures, light transmittance of the plurality of transparent carbon nanotube composite film structures is higher than light transmittance of the plurality of transparent carbon nanotube film structures.

16. The method of claim 15, wherein the plurality of transparent carbon nanotube film structures are placed side by side on the surface of the supporting substrate.

17. The method of claim 15, wherein the step of removing the plurality of transparent carbon nanotube film structures with the supporting body from the transparent polymer solution further comprises removing the plurality of transparent carbon nanotube film structures with the supporting body vertically from the transparent polymer solution.

18. The method of claim 15, wherein the transparent polymer solution comprises a transparent polymer, and a weight percentage of the transparent polymer in the transparent polymer solution is lower than or equal to 10% wt.

19. The method of claim 15, wherein the supporting body is a supporting frame or a supporting substrate having a sheet-like structure.

20. A method for making a transparent carbon nanotube composite film comprising the following steps:
(a) providing a transparent carbon nanotube film structure comprising a plurality of first carbon nanotubes substantially parallel to a surface of the transparent carbon nanotube film structure, a plurality of second carbon nanotubes protruding from the surface of the transparent carbon nanotube film structure, and a plurality of interspaces defined by the plurality of first carbon nanotubes and the plurality of second carbon nanotubes;
(b) placing the transparent carbon nanotube film structure on a supporting body;
(c) vertically immersing the transparent carbon nanotube film structure with the supporting body into a transparent polymer solution, pressing down the plurality of second carbon nanotubes by a pressure from the transparent polymer solution to make the plurality of second carbon nanotubes and the plurality of first carbon nanotubes in a same planar surface, and filling the transparent polymer solution into the plurality of interspaces; and (d) vertically removing the transparent carbon nanotube film structure with the supporting body thereon from the transparent polymer solution, to form the transparent carbon nanotube composite film structure.

\* \* \* \* \*